July 8, 1930.　　　　A. BOYNTON　　　　1,770,023
STAGE LIFT FLOWING DEVICE
Filed May 6, 1927
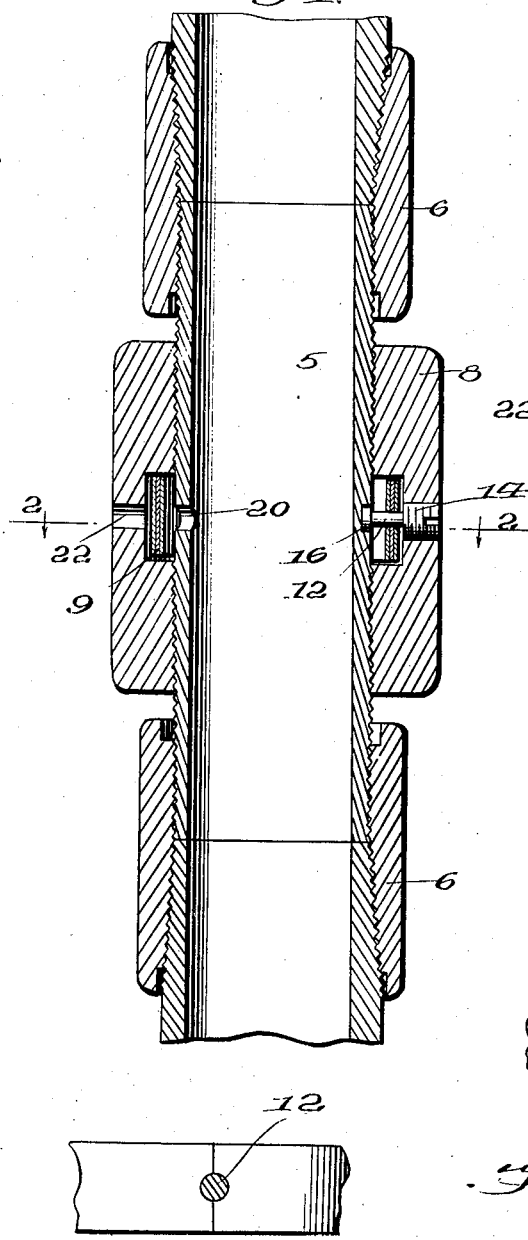
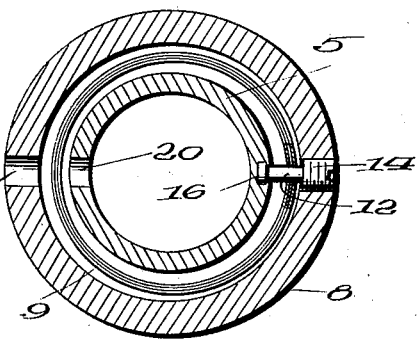
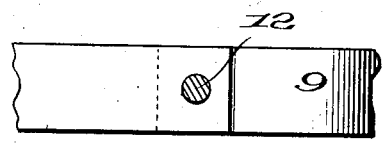
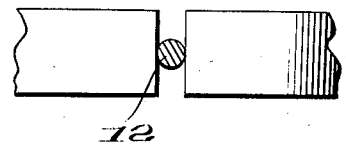
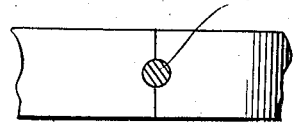
Inventor
ALEXANDER BOYNTON
By
J. G. Quesada
Attorney Patented July 8, 1930

1,770,023

UNITED STATES PATENT OFFICE

ALEXANDER BOYNTON, OF SAN ANTONIO, TEXAS

STAGE-LIFT FLOWING DEVICE

Application filed May 6, 1927. Serial No. 189,302.

This invention relates to stage lift flowing devices for use in oil and other wells.

Briefly stated an important name is to provide simple means by which the difference in tubing and casing pressures may be utilized to allow of the admission of a lifting medium, such as compressed air or gas, to the column of fluid to be elevated at the most advantageous periods whereby to conserve the supply of compressed air or gas.

Another and equally important object is to provide a stage lift flowing device by means of which the well may be flowed through the tubing or the casing with equally good results.

Other objects and advantages will be apparent during the course of the following description.

In the accompanying drawing forming a part of this application and in which like numerals are employed to designate like parts throughout the same, Figure 1 is a vertical sectional view through the improved stage lift flowing device applied, Figure 2 is a horizontal sectional view taken on line 2—2 of Figure 1, Figure 3 is a detail view illustrating the manner in which the ends of pressure responsive springs may be anchored, Figure 4 is a similar view illustrating a modified form of retaining means for the ends of the springs, Figure 5 is a detail sectional view illustrating still another form of anchoring means for the ends of the pressure responsive springs.

In the drawing the numeral 5 designates a tubular body having suitable means, such as couplings 6, by which the same may be incorporated in a tubing. Figure 1 illustrates that the body 5 is externally threaded to permit of the application of an internally threaded tubular valve housing 8. The valve housing is provided between the ends thereof with an internal annular groove in which one or more annular leaf springs 9 movably operate. The ends of the spring or springs may be apertured for the reception of the reduced stem 12 of a combined locking and tensioning screw 14. It is important to note that the combined locking and tensioning screw is threaded through one side of the valve housing 8 and that the stem is extended into a socket 16 in the body 5 to hold the ends of the leaf spring or springs in place and at the same time to hold the housing 8 against turning on the body.

It is important to hold the housing 8 against turning so that the fluid passages 20 and 22 in the body and the housing respectively will remain in registration or substantially so.

The inherent flexibility of the spring 9 is sufficient to hold the spring in constant pressure engagement with the stem 12 so there is no movement of the spring with respect to the stem during the adjustment of the member 14.

As shown in Figure 3, the end portions of the spring 9 may be overlapped and formed with apertures snugly receiving the stem 12.

Figure 4 illustrates that the ends of the spring may be perfectly plain for engagement with opposite sides of the stem 12 by which the spring is held in place.

Figure 5 illustrates that the ends of the spring may be formed with opposed semicircular notches to define a recess through which the reduced stem is extended to hold the spring in place.

If the well is to be flowed through the tubing a lifting medium, such as compressed air or gas, is supplied to the casing exteriorly of the tubing so that when the difference in pressure between the tubing and casing fluids is below a predetermined point the spring or springs 9 will remain substantially in the position illustrated in Figure 1 and compressed air or gas will be admitted to the tubing. As the pressure within the tubing drops due to the flow of the fluid therein under the influence of the lifting medium the spring or springs will be moved in the direction of the port 20 to diminish or possibly cut off the admission of additional lifting fluid to the tubing, the extent of movement of the spring being governed by the difference in pressures, within certain limits, between the tubing and casing fluids.

If it is desired to have the spring 9 diminish or cut off the supply of lifting medium to the tubing only in response to a high differential the pressure screw 14 is moved inwardly to increase the tension of the spring. If it is desired to render the spring 9 more sensitive some or all of the pressure exerted by the tensioning screw may be relieved.

If it is desired to flow the well through the casing the lifting fluid, such as compressed air or gas, is introduced by way of the tubing and when a low differential in tubing and casing pressures obtains the spring 9 will remain substantially in the position illustrated in Figure 1 to allow of the movement of the lifting fluid out through the port 22. The discharge of the lifting fluid into the casing will result in the upward movement of the oil or other fluid being flowed and the pressure within the casing will promptly drop. When the pressure in the casing thus drops with respect to the pressure within the tubing the spring 9 will be drawn in the direction of the port 22 to partly or completely close the same so that the subsequent building up of casing pressure will again bring about a low differential between casing and tubing pressures and the consequent uncovering of the port 22 to renew the supply of lifting fluid to the casing.

In summarizing it will be seen that when a low differential obtains between casing and tubing fluids the ports for the passage of the compressed air or gas will be uncovered to allow of the movement of the compressed air or gas into lifting relation to the oil or other product of the well. When a high differential obtains as a result of the movement of the oil or other product of the well the supply of compressed air or gas will be diminished and possibly cut off whereby the supply of compressed air or gas is conserved for use during the most advantageous periods.

Particular attention is directed to the fact that the compressed air or gas must pass about the edges of the spring 9 during its movement into lifting relation to the oil or the like and the spring is therefore at all times responsive to the varying pressure differentials in casing and tubing pressures. In fact as previously suggested the successful operation of the invention is dependent on the location of the spring within the zone of influence of the pressures interiorly and exteriorly of the body 5.

In practice compressed air or gas from an outside source may be employed or if the gas pressure in the well is sufficient no outside sources need be called upon. It will be observed that the improved induction valve may be applied either end up so that installation is simplified.

Having thus described the invention, what is claimed is:

1. A valve comprising a body having a port for the passage of a fluid, a spring extending across said port to diminish or cut off the movement of a fluid through the same, a housing for the spring, and a tensioning device engaging the spring and having locking contact with the housing and the body to hold the housing against movement with respect to the body.

2. A valve comprising a body having a passage for a fluid, a curved leaf spring extending across said passage and being within the zone of influence of the fluid pressures interiorly and exteriorly of the body, an attaching device for said spring, a housing carrying said attaching device and enclosing said spring, said attaching device being provided with means engaging said body to hold the housing against turning.

3. A valve comprising a body having means whereby the same may be incorporated in a well tubing and provided with a port for the passage of a fluid lifting medium, an annular leaf spring encircling said body and extending across said port to control the movement of a lifting medium therethrough, a housing having an annular groove receiving said spring, and a spring attaching device carried by said housing and having means engaging said body to hold the housing against turning and engaging the spring.

4. A valve comprising a body having means whereby the same may be incorporated in a well tubing, a leaf spring valve extending about the body, a carrier encircling the body, said carrier and said body being provided with ports controlled by said leaf spring valve and being adapted for the movement of a fluid lifting medium, and an attaching device having means to secure said spring valve in place and engaging said body and said carrier to hold the carrier against movement with respect to the body.

5. A valve comprising a body, a carrier detachably mounted on the body and having a groove, said carrier and said body being provided with ports communicating with said groove, a leaf spring valve in said groove and having means controlling the movement of a lifting medium through said ports, said groove being provided with walls spaced from the edges of said spring to define passages for the fluid lifting medium, and a spring tensioning screw engaging the carrier and the body to hold the carrier against movement with respect to the body and having means to hold the spring valve in place.

6. In a stage lift flowing device for wells, a body having a flow passage and a two way port for communication with the flow passage, and a valve element controlling said port and being responsive in either direction to the difference in pressures prevailing interiorly and exteriorly of the body to throttle the flow of fluid in the direction of the differential.

7. In a stage lift flowing device for wells, a body having means whereby the same may be incorporated in a well tubing and being provided with a flow passage for constant communication with the tubing, said body being provided with a two way port for the passage of a fluid, a valve element associated with said port and being responsive in either direction to the pressure differential between the fluids interiorly and exteriorly of the tubing to throttle the flow of fluid in the direction of the differential, and a flexible support for said valve element.

8. In a stage lift flowing device for wells, a body having means whereby the same may be incorporated in a well tubing and having a flow passage for constant communication with the tubing, there being two way ports for communication with the flow passage and the tubing, and a flexible support having means controlling said two way ports and being responsive to a pressure differential in either direction.

In testimony whereof I affix my signature.

ALEXANDER BOYNTON.